United States Patent
Mottier

[11] 3,719,076
[45] March 6, 1973

[54] APPARATUS FOR THE HOLOGRAPHIC ANALYSIS OF OSCILLATING OBJECTS

[75] Inventor: Francois Mottier, Zurich, Switzerland

[73] Assignee: Brown Boveri & Company Limited, Baden, Switzerland

[22] Filed: June 23, 1971

[21] Appl. No.: 158,652

[30] Foreign Application Priority Data

July 1, 1970 Switzerland..................10038/70

[52] U.S. Cl. .....................73/71.3, 350/3.5, 356/106
[51] Int. Cl..........................G01h 9/00, G02b 27/00
[58] Field of Search ..........73/71.3; 350/3.5; 356/106

[56] References Cited

OTHER PUBLICATIONS

C. C. Aleksoff, Time Average Holography Extended, Applied Physics Letters, Jan. 1, 1969, p. 23 & 24.

*Primary Examiner*—Charles A. Ruehl
*Assistant Examiner*—John P. Beauchamp
*Attorney*—W. G. Fasse

[57] ABSTRACT

A method and apparatus for holographic analysis of oscillating objects, in which the recording laser beam, either before or after being split into reference and object beams, is amplitude modulated according to the function:

$$\sum_{k=0}^{n} \cos[kz_0 \sin(\omega t + \varphi)]$$

where $z_0$ is an adjustable amplitude, $\omega$ is the angular frequency of oscillation of an object, $\phi$ is a phase constant, and $n$ is the ordinal number of the greatest amplitude of the oscillating object to be detected.

1 Claim, 7 Drawing Figures

APPARATUS FOR THE HOLOGRAPHIC ANALYSIS OF OSCILLATING OBJECTS

BACKGROUND OF THE INVENTION

This invention relates to a method and apparatus for the holographic analysis of oscillating objects.

It is known (J. Opt. Soc. Am. 55 (1965) 1593) that the hologram reconstruction of an object performing standing oscillations produces greater values of brightness for the nodes of oscillation and for locations of equal amplitude of oscillation (isoamplitude lines) at a distance of about $\lambda/4$, where $\lambda$ is the wavelength of laser light, than for the remaining points of the object. This enables the oscillatory behavior of the object to be analyzed in simple fashion.

However, the known method has the disadvantage that the brightness of the isoamplitude lines and thus the quality of recording quickly decreases for increasing values of amplitude. It is thus possible to evaluate the oscillatory picture only in the immediate vicinity of the nodal lines, that is to say only for small amplitudes of oscillations of the object.

An improvement in the known method is obtained by phase-modulating the reference wave used for the hologram recording with a triangular function (Appl. Phys. Lett. 15 (1969) 9, 285). This reduces the large differences in brightness values for the nodal lines and the isoamplitude lines; and it is even possible to record isoamplitude lines of selectable amplitude with greater brightness than the nodal lines.

Nevertheless, this known method also is still limited with respect to the representations of isoamplitude lines of fairly large amplitudes.

OBJECTS OF THE INVENTION

In view of the foregoing it is an object of the invention to overcome the drawbacks of the prior art.

It is therefore also an object of the invention to provide a method and arrangement by means of which points on an object which are oscillating at predetermined amplitudes can be recorded beside the nodal lines at maximum brightness, wherein the amplitudes are to be selectable within wide limits while constituting a finite arithmetical sequence.

SUMMARY OF THE INVENTION

According to the invention these objects have been achieved by amplitude modulating the recording laser beam in accordance with a function which can be described at least approximately by the sum $$\sum_{k=0}^{n} \cos [kz_0 \sin (\omega t + \varphi)]$$

where $z_0$ is a freely selectable amplitude, $\omega$ is the angular frequency of the oscillating object, $\phi$ is a phase-constant, and n is the ordinal number of the greatest amplitude still to be picked up. The laser beam is preferably modulated before being split up into object and reference beams, but the invention is also applicable if only the object beam or only the reference beam is modulated.

For $\omega$ purpose, the laser beam or the reference beam or the object beam is periodically interrupted by means of strobe pulses derived from a control function $z_0 \sin \omega t$, in such a manner that an interruption will take place except when the control function passes through predetermined ranges spaced apart by $2\pi$.

SHORT FIGURE DESCRIPTION

In order that the invention may be clearly understood, it will now be described by way of example with reference to the accompanying drawings, wherein:

FIG. 1b shows a modified saw-tooth oscillation $|z_0 \sin \omega t|$ (mod $2\pi$) derived from the waveform of FIG. 1a;

FIG. 4a illustrates the brightness distribution of the hologram reconstruction of an oscillating object without, while

DESCRIPTION OF AN EXAMPLE EMBODIMENT

Figure 2:
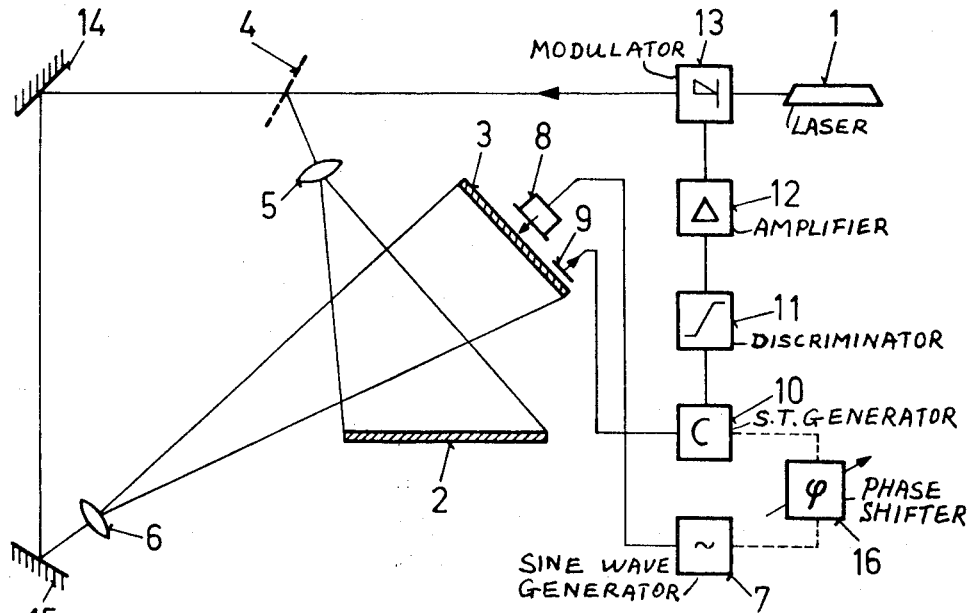
FIG. 2 shows a schematic diagram of the measuring apparatus according to the invention.

Referring to FIG. 2, in a holographic recording, the coherent, monochromatic light of a laser 1 is used to illuminate on the one hand a photographic plate, namely the hologram plate 2, and on the other hand the object 3 to be holographed. This is done, as a rule, by means of a semi-translucent mirror which acts as a beam splitter 4 for producing a reference beam which illuminates the hologram plate 2 and an object beam which illuminates the object 3. The object beam and the reference beam are fanned out by means of lenses 5, 6 in order to illuminate the object 3 and the hologram plate 2. The light scattered by the object 3 interferes with the reference wave, inter alia, at the location of the hologram plate 2 so that an interference pattern is recorded which results, after the plate has been developed, in the presence of a geometrically equal illumination by the reference wave, in a radiation field as the one originally produced by the illuminated subject. Thus, the object is reconstructed in true-to-life fashion by means of the hologram. Now, if a point on the object is oscillating in accordance with a function $b \sin \omega t$ while the recording is being made, the amplitude of the reconstructed wave field for this point is attenuated by a factor, $$(1) \quad D = \frac{1}{\tau} \int_0^\tau \cos\left(\frac{4\pi b}{\lambda} K \cos \omega t\right) dt$$

where $\tau$ is the exposure time, $b$ the amplitude of mechanical oscillation of the point, $\lambda$ the laser light wavelength, $K$ an apparatus constant and $\omega$ the angular-frequency of oscillation of the point.

The evaluation of the integral results in a zero-order Bessel function with the argument $Z = 4\pi b K/\lambda$, that is to say $J_0(z)$, so that the intensity with which the oscillating point is reconstructed is proportional to $J_0^2(z)$. It may be seen from this that only the nodal line ($z = 0$) is recorded to maximum brightness ($J_o^2(0) = 1$), while isoamplitude lines appear progressively weaker with increasing amplitude $z$.

The modulation according to the invention results in a multiplication of the expression (1) by the following expression (2)
$$\sum_{k=0}^{n} \cos[kz_0 \sin(\omega t + \varphi)]$$

Thus the amplitude with which the oscillating point on the object is reconstructed is now attenuated by the factor (3)
$$D' = \frac{1}{\tau}\int_0^\tau \cos(z\cos\omega t)dt + \frac{1}{\tau}\int_0^\tau \cos[z\cos\omega t - z_0\sin(\omega t + \varphi)]dt$$
$$+ \ldots + \frac{1}{\tau}\int_0^\tau \cos[z\cos\omega t - nz_0\sin(\omega t + \varphi)]dt$$

From the expression (3) it may be seen that for a phase $\phi = \pi/2$; $D'$ assumes the maximum value for points on the object which are oscillating at an amplitude $z = k'z_0$, where $k'$ is a whole negative or positive number $\leq n$ or zero. Thus $D'$ is also a maximum for the nodal points, $z = o$.

The amplitude-modulation according to the invention has the effect that the hologram plate is exposed only in the time intervals $\Delta\tau_i(t)$ in which the integrands of expression (3) are approximately equal to 1, or the arguments of the cosines of the integrands are approximately equal to $k'\,2\pi$. Expression (1) may thus be written:

(4)
$$D'' = \sum_{i=1}^{N} \frac{1}{\Delta\tau_i(t)} \int_{(\Delta\tau_i)} \cos(z\cos\omega t)dt$$

in this connection, $\Delta\tau_i(t)$ follows from the condition $$\cos(z_0 \cos\omega t) \geq 1 - \epsilon \quad (5)$$

which must be complied with at the time $t$ and for the duration of the interval $\Delta\tau_i$, for the selectable amplitude of oscillation $z_0$, whereby $\epsilon$ represents a preferably adjustable interval.

In the limiting case $\epsilon \to 0$ and $n \to \infty$, expression (4) for $D''$ corresponds to expression (3) for $D'$. Just as $D'$, $D''$ assumes maximum values for object-points which oscillate at the amplitude $z_0$ or integral multiples thereof.

The smaller the interval chosen for $\epsilon$, the more isoamplitude lines can be recognized, and the greater $\epsilon$ is, the shorter become the exposure time.

It can also be seen from the foregoing expressions (2), (3) that the phase-relationship between the modulation function and the object oscillation is highly significant, and that particularly the two oscillations must be synchronous.

Figure 1A:
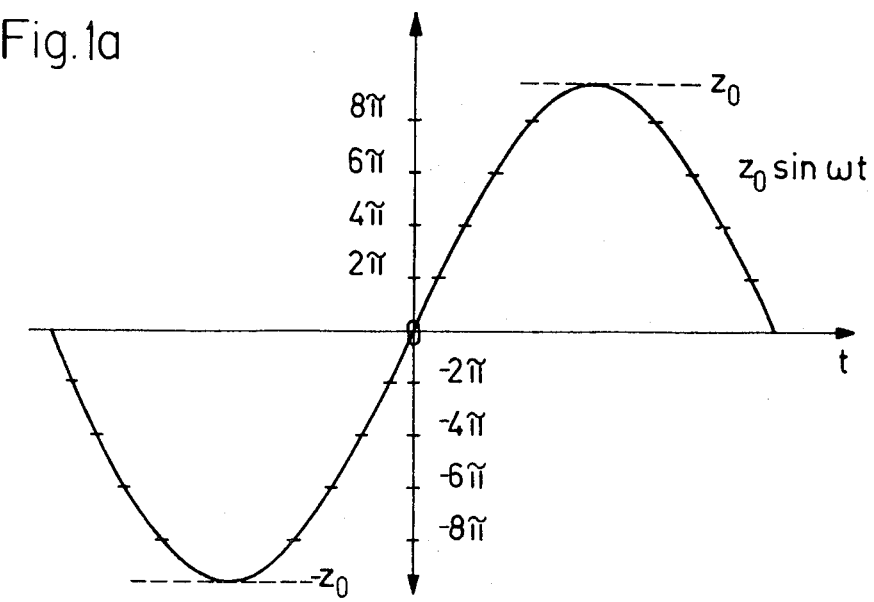
FIG. 1a shows the representation of one cycle of a control function $z_0 \sin \omega t$.

In order to produce amplitude-modulation according to the invention for the laser light, a control function $z_0 \sin\omega t$, one cycle of which is illustrated in FIG. 1a, is first generated. The function is generated in the form of an electrical signal having an adjustable amplitude $z_0$. This signal is then subjected to full wave rectification and chopped up in a modulus of $2\pi$, so that a modified saw-tooth waveform illustrated in FIG. 1b results. The strobe pulses of FIG. 1c which produce the amplitude modulation are then derived from this curve, with a flank occurring each time the curve of FIG. 1b passes through the lower threshold value A and the upper threshold valve B. A and B are symmetrically disposed with respect to the ordinate value $\pi$. As may be seen from FIG. 1c, position and width modulated rectangular pulses are produced which, because of their high harmonic content, represent a good approximation of the modulation function according to expression (2).

According to FIG. 2, a sinusoidal generator 7, which actuates a sound transmitter 8, is provided for setting the object 3 in standing oscillations. The mechanical oscillations of the object 3 are converted by a pick-up 9 into electrical oscillations which are fed to a stage 10 identified by C, which stage generates the modified saw-tooth waveform of FIG. 1b in a manner to be explained with reference to FIG. 3. A single channel or window discriminator 11, which will likewise be explained in more detail with reference to FIG. 3, generates strobe pulses of the type illustrated in FIG. 1c from the modified saw-toothed waveform of stage 10. These strobe pulses, after having been amplified in the amplifier 12, actuate a modulator 13, for example a Pockels cell between two crossed polarizers, which modulator is arranged in the lightbeam of the laser 1. The modulator 13 could also be arranged in the beam path of the object wave, that is, between a beam-splitter 4 and the lens 6, or in the beam path of the reference wave, that is between the beam-splitter 4 and the lens 5. Fixed mirrors 14 and 15 are provided for deflecting the object-beam.

The arrangement illustrated in FIG. 2 assures a constant synchronization of the modulation function with the oscillation of the object, since the control function for the stage 10 is derived directly from the oscillating object 3 by means of the pick-up 9. However, this pick-up 9 may be omitted if the stage 10 is connected to the sinusoidal generator 7 and the phase relationship of the control function $z_o \sin\omega\, t$ produced by the generator 7 is regulated by means of a phase-shifter 16. This is illustrated by dashed lines in FIG. 2.

If the most advantageous phase is manually adjusted by means of the phase-shifter 16, it is advisable to arrange a developed hologram of the object 3 in a fixed position in the place of the hologram plate 2. It is then possible, by observing the object through the hologram, to follow the striped image of the oscillating object directly in real time.

Figure 3:
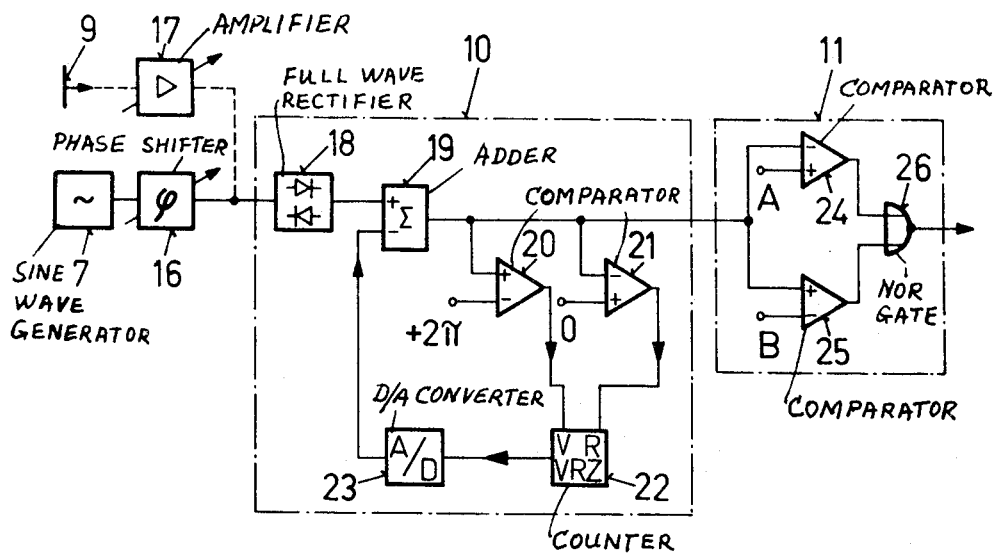
FIG. 3 shows a schematic diagram of the electronic control circuit for modulating the laser beam or the object beam.

FIG. 3 illustrates the circuit for generating the strobe pulses, more particularly the stage 10 and 11. Either the pick-up 9 coupled to the object 3 followed by an adjustable amplifier 17 or the sine wave generator 7 with the phase-shifter 16 may be used in order to generate the control function $z_o \sin\omega\, t$. The control function $z_o \sin\omega t$ is subjected to full-wave rectification in the stage 18. The thus rectified oscillation is then fed to the input of an adder 19, the output of which is connected as shown to inputs of comparators 20 and 21. Fixed voltages $2\pi$ and 0 are supplied to the other inputs of the comparators 20 and 21 respectively. As a result, the oscillation $z_o \sin\omega\, t$ is compared in the comparators 20, 21 with the values 0 and $2\pi$. The first comparator 20 delivers a pulse when $|z_o \sin\omega t|$ increases to $2\pi$; the second comparator 21 delivers a pulse when $|z_o \sin\omega t|$, decreases to 0. A pulse from the first comparator 20 switches a forward-and-reverse counter 22 one unit forwards, and a pulse from the second comparator 21 switches the counter 22 one unit backwards. The respective output value of the counter 22 is transformed in a digital-to-analogue converter 23 into multiples of $2\pi$, which are then subtracted in the adder 19 from the oscillation $z_0 \sin \omega t$. In this way, a modified saw-tooth waveform $|z_0 \sin \omega t|$ (mod $2\pi$) appears at the output of the stage 10 and as in FIG. 1b.

Figure 1B:
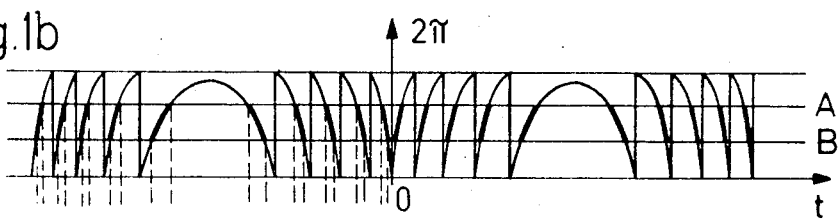
Figure 1C:
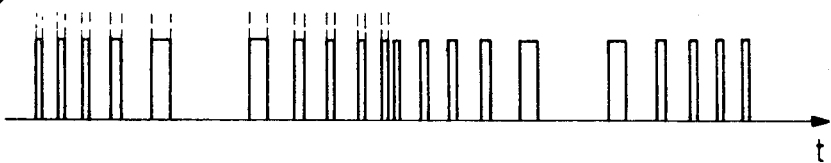
FIG. 1c shows strobe pulses, derived from the oscillation according to FIG. 1b, for amplitude-modulating the laser beam, or the object beam, or the reference beam.

The modified saw-tooth waveform is then fed to the stage 11 which is a conventional window discriminator giving a positive output signal as long as the input signal lies between the threshold values A and B. The stage comprises for example two comparators 24, 25 and a NOR-Gate 26. The positions of the threshold values A, B which are also indicated in FIG. 1b, and which are applied to the comparators 24, 25 as shown, are adjustable relative to each other with regard to their level and spacing or difference. This corresponds to the variation of the interval $\epsilon$ discussed above. In order to prevent a phase shift when the control function $z_0 \sin \omega t$ passes through zero, A and B are symmetrically disposed with respect to the value $\pi$. The strobe pulses illustrated in FIG. 1c appear at an output of the NOR-Gate and controls the interruptor or modulator 13 (FIG. 2), preferably after amplification in the stage 12.

The illustrated electronic circuit arrangement constitutes but one of a plurality of possible embodiments for putting the invention into effect.

Figure 4A:
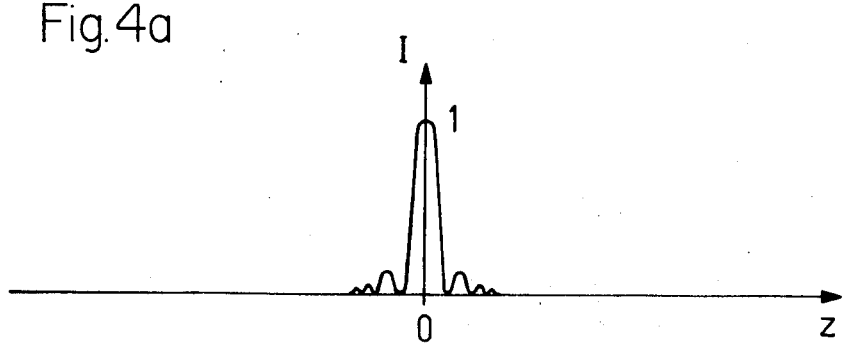
Figure 4B:
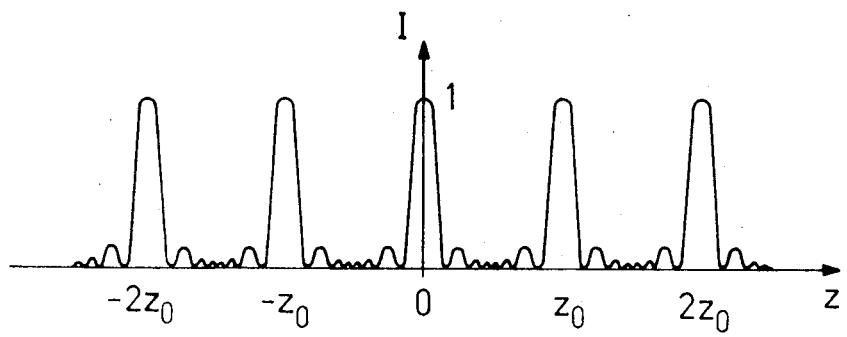
FIG. 4b shows the brightness distribution of the hologram reconstruction of an oscillating object with amplitude-modulation according to the invention.

If the hologram is produced by a laser beam amplitude-modulated by the above described strobe pulses, not only are the locations of the nodal lines ($z = o$) constructed with maximum brightness I, while the brightness I used to drop rapidly for isoamplitude lines of greater amplitude (FIG. 4a). On the contrary, all the isoamplitude lines of an amplitude $z_0$, which is selectable by means of the control function, and whole positive or negative multiples of the amplitude $z_0$ appear as well as the nodal lines $z = o$, with almost undiminished brightness (I = 1). This important advantage of the invention is illustrated in FIG. 4b. The stripes of maximum brightness I = 1 at $z = k' z_0$ are accompanied in each case by small subsidiary maxima whose intensities drop in accordance with the square of a zero-order Bessel function.

Although a specific embodiment has been illustrated and described, it is to be understood that it is intended to cover all modifications and equivalents within the scope of the appended claims.

What I claim is:

1. A method for the holographic analysis of an oscillating object, comprising directing a laser beam at said object as well as at a holographic plate, said plate also being impinged by reflections of said beam from said object, and amplitude modulating at least a portion of said beam substantially in accordance with the function:

$$\sum_{k=0}^{n} \cos [kz_0 \sin (\omega t + \varphi)]$$

where $z_0$ is a freely selectable amplitude, $\omega$ is the angular frequency of the oscillating object, $\phi$ is a phase-constant, and $n$ is the ordinal number of the greatest amplitude of the oscillating object to be detected.

2. The method according to claim 1, wherein said step of amplitude modulating comprises periodically interrupting said beam by means of strobe pulses derived from a control function $z_0 \sin \omega t$, whereby the beam interruption occurs only when the control function passes through predetermined ranges of values spaced by $2\pi$.

3. The method according to claim 2, wherein said strobe pulses are derived by rectifying and chopping said control function in a modulus of $2\pi$ to produce a modified saw-tooth wave, and deriving said strobe pulses from said modified saw-tooth wave when said modified saw-tooth wave is passing through a predetermined range of values.

4. The method according to claim 3, comprising varying the width of said range of values.

5. The method according to claim 2, further comprising synchronizing said control function with the oscillating of said object.

6. The method according to claim 5, comprising deriving said control function from said oscillating object.

7. The method according to claim 1, comprising holographically producing an image of the object in stationary condition, and placing said produced image at said plate.

8. An apparatus for the holographic analysis of an oscillating object, comprising a laser for providing a laser beam, a holographic plate, means for directing said beam on said oscillating object and on said holographic plate, means for directing reflections of said beam from said object onto said plate, and means for modulating at least a portion of said beam substantially in accordance with the function:

$$\sum_{k=0}^{n} \cos [kz_0 \sin (\omega t + \varphi)]$$

where $z_0$ is a freely selectable amplitude, $\omega$ is the angular frequency of the oscillating object, $\phi$ is a phase-constant, and $n$ is the ordinal number of the greatest amplitude of the oscillating object to be detected.

9. The apparatus according to claim 8, comprising means for deriving a control function $z_0 \sin \omega t$, means for full-wave rectifying said control function, and means for deriving strobe pulses from the rectified control function to produce modulating signals for modulating said laser beam.

10. The apparatus according to claim 9, wherein said means for deriving strobe pulses comprises an adder having a first input connected to receive said rectified control function, first and second comparators each having first and second inputs, said first input being connected to the output of said adder, means for applying voltages having fixed values of zero and $2\pi$ to the second inputs of said first and second comparators respectively, a counter having a forward counting input, a backward counting input and an output, means connecting the output, of said first and second comparators to said backward and forward counting inputs respectively, means for applying the output of said counter to the other input of said adder, and window discriminator means connected to the output of said adder for deriving said strobe pulses.

11. The apparatus according to claim 9, wherein said means for deriving said control function comprises a sine wave generator and an adjustable phase shifter connected thereto.

12. The apparatus according to claim 9, wherein said means for deriving said control function comprises pickup means coupled to said object, and adjustable amplifier means connected to said pickup means.

13. The apparatus according to claim 10, wherein said window discriminator means is connected to said means for deriving strobe pulses to provide an output as long as the input to the discriminator means is within a predetermined voltage range disposed with respect to a given level.

14. The apparatus according to claim 13, comprising means for adjusting the position and the width of said voltage range.

15. The apparatus according to claim 13, wherein said given voltage level is the level $\pi$.

* * * * *